US005958586A

United States Patent [19]

Grossoleil et al.

[11] Patent Number: 5,958,586

[45] **Date of Patent: *Sep. 28, 1999**

[54] MONODISPERSE PARTICLE LATICES OF VINYL CHLORIDE POLYMERS

[75] Inventors: Jacques Grossoleil, Orthez; Patrick Kappler, Ecully; Nicolas Krantz, Bernay, all of France

[73] Assignee: Elf Atochem S.A., Puteaux, France

[ * ] Notice: This patent is subject to a terminal disclaimer.

[21] Appl. No.: 08/461,749

[22] Filed: Jun. 5, 1995

Related U.S. Application Data

[60] Continuation of application No. 08/184,451, Jan. 21, 1994, abandoned, which is a division of application No. 07/765,496, Sep. 26, 1991, Pat. No. 5,296,575, which is a continuation of application No. 07/180,837, Apr. 12, 1988, abandoned.

[30] Foreign Application Priority Data

Apr. 14, 1987 [FR] France .................................. 87 05260

[51] Int. Cl.[6] .............................. B32B 5/16; C08F 2/00; C08J 0/00

[52] U.S. Cl. ......................... 428/402; 526/212; 526/229; 524/457; 524/458; 524/459

[58] Field of Search ............................ 428/402; 526/212, 526/229; 524/457, 458, 459

[56] References Cited

U.S. PATENT DOCUMENTS

| | | | |
|---|---|---|---|
| 2,511,593 | 6/1950 | Lightfood . | |
| 2,625,539 | 1/1953 | Folt | 526/229 |
| 2,777,836 | 1/1957 | Everard . | |
| 3,403,122 | 9/1968 | Sherman et al. | 526/229 |
| 3,488,328 | 1/1970 | Koyanagi et al. | 526/212 |
| 3,554,954 | 1/1971 | Rosis et al. | 526/229 |
| 3,578,648 | 5/1971 | Taima et al. | 526/229 |
| 5,296,575 | 3/1994 | Grossoleil | 526/212 |

FOREIGN PATENT DOCUMENTS

| | | |
|---|---|---|
| 889980 | 9/1953 | Germany . |
| 699016 | 10/1953 | United Kingdom . |
| 991536 | 5/1965 | United Kingdom . |

*Primary Examiner*—William Krynski
*Assistant Examiner*—J. M. Gray
*Attorney, Agent, or Firm*—Burns, Doane, Swecker & Mathis, L.L.P.

[57] ABSTRACT

Improved monodisperse spheroidal particle latices of vinyl chloride polymers, e.g., having particle sizes ranging from 0.17 to 0.8 μm or from 0.5 to 1.2 μm, are produced by aqueous emulsion polymerization of vinyl chloride monomer, whether in a single stage or in two stages, in the absence of surface-active agent, in the presence of at least 0.2% by weight of at least one water-soluble alkali metal or ammonium persulfate initiator, and also in the presence of at least one water-soluble auxiliary compound that is a solvent for vinyl chloride, in such amount that the solubility of vinyl chloride in the aqueous phase at 25° C. at atmospheric pressure is at least 1.5 g/l.

6 Claims, No Drawings

MONODISPERSE PARTICLE LATICES OF VINYL CHLORIDE POLYMERS

This application is a continuation of application Ser. No. 08/184,451, filed Jan. 21, 1994, now abandoned, which is a divisional of application Ser. No. 07/765,496, filed Sep. 26, 1991 now U.S. Pat. No. 5,296,575, which is a continuation of application Ser. No. 07/180,837, filed Apr. 12, 1988, now abandoned.

BACKGROUND OF THE INVENTION

1. Field of the Invention

The present invention relates to a process for preparing vinyl chloride homo- and copolymers in the form of latices comprised of monodisperse particles, and, more especially in the form of latices comprised of coarse particles, by polymerization of the corresponding monomer(s) in aqueous emulsion. This invention also relates to the final product latices and to the homo- and copolymers recovered from such latices.

2. Description of the Prior Art

It is known to this art that latices of vinyl chloride polymers are aqueous dispersions of particles of such polymers, the diameters of which typically range from 0.01 to 5 μm.

By the term "monodisperse" particles as utilized herein, are intended particles whose particle size distribution is characterized by a polydispersity coefficient not exceeding 0.06.

By "coarse" particles are intended particles whose mean diameter is at least 0.5 μm.

Latices containing monodisperse particles are of interest to the art because of the fact that prior knowledge of the mean diameter of such particles and the polymer content thereof makes it possible, by mathematical calculation, to accurately determine the value of the total surface area of the interface between the particles and the aqueous phase.

Latices which can be employed as biological reactants enabling certain pathological disease states to be detected are obtained by graft polymerization of vinyl monomers containing functional groups such as, for example, —COOH, —$SO_3$ and —$NH_2$ in the presence of the aforementioned latices.

The latices may, furthermore, be used as standards in methods of measuring diameters utilizing all scientific apparatus which includes devices for measuring diameters and operating in this range of values (particle size distribution analysis equipment, filtration equipment, calibrated pore membranes).

Upon admixture with one or more liquid plasticizers, the homo- and copolymers derived from the latices are obviously capable of being employed for the preparation of plastisols which can be utilized in an appropriate manner in a great number of techniques such as, especially, coating, rotational molding, dip coating and spraying. It is possible to prepare plastisols with accurately determined Theological behavior by use of a mixture of at least two homo- or copolymers derived from latices, at least one of which contains monodisperse particles having a mean diameter greater than 0.8 μm.

Techniques for preparing vinyl chloride homo- and copolymers in the form of latices containing coarse monodisperse particles, by polymerization of the corresponding monomer(s) in aqueous emulsion, are also known to this art. These techniques entail a number of polymerization stages, each stage being carried out under moderate stirring, in the presence of at least one emulsifier and at least one water-soluble initiator. In the first stage, a latex of vinyl chloride homo- or copolymer containing particles having a mean diameter generally ranging from 0.1 to 0.3 μm is prepared. It is known that the particle size distribution of the particles of the resulting latex depends essentially upon the nature of the emulsifier employed and on the initial rate of polymerization. Thus, for example, when employed as an emulsifier, sodium versatate produces, all other parameters remaining unchanged, latices whose particles have a particle size distribution with a lower polydispersity index than sodium myristate or sodium laurate. It is also known that polymerization at a high initial rate produces, all other parameters remaining unchanged, latices whose particles have a particle size distribution with a lower polydispersity coefficient than a polymerization at a low initial rate. The disadvantage of polymerization at a high initial rate is that the polymerization rate, being autoaccelerated, is no longer compatible, at a high degree of conversion of the monomer(s), with the heat transfer capacities of the reactor in which the polymerization takes place. Consequently, even when the operating conditions of polymerization promote the production of latices containing particles which have a particle size distribution with a lower polydispersity coefficient, the said polydispersity coefficient is generally greater than 0.1. In the second stage, a seeded emulsion polymerization is carried out in the presence of the latex originating from the first stage, as the seed material. A latex is obtained in which the particles have a mean diameter generally ranging from 0.3 to 0.9 μm, higher than that of the particles of the seed material, and having a particle size distribution with a lower polydispersity coefficient, but which is still, in the majority of cases, greater than 0.08. Consequently, in order to obtain a latex containing coarse monodisperse particles, it becomes necessary to carry out more than two stages of polymerization, by employing as seed material, at each stage, from the second stage forwards, the latex originating from the preceding stage and employing a high proportion of seed polymer. Not infrequently, it becomes necessary to conduct four or five polymerization stages, and this entails protracted and costly operations, with loss of product at each stage.

In the article *Plastics and Rubber: Materials and Applications,* "Mechanism of emulsifier-free emulsion polymerization of vinyl chloride", February 1980, pages 21 to 24, J. Laaksonen and P. Stenius have described a technique for polymerizing vinyl chloride in aqueous emulsion which consists of operating in the complete absence of emulsifier, and in the presence of an alkali metal or ammonium persulfate as a water-soluble initiator, employed in a large quantity. In this article, the authors describe the means which enable a polyvinyl chloride latex containing monodisperse particles having a mean diameter ranging from 0.380 μm to 0.535 μm to be produced in a single stage. These means consist of the addition to the reaction medium, before polymerization, of a salt such as, for example, potassium chloride or calcium chloride, the cation of which, designated a counterion, is of a specified nature and is present in a specified amount. The mean particle-diameter of the latex obtained is a function of the intensity of stirring of the reaction mixture. It is proportionally higher, all other parameters remaining unchanged, the greater the intensity of stirring.

It has now been found, however, that the technique described by Laaksonen and Stenius suffers from the following disadvantages: the molecular weight of the polymer obtained depends on the intensity of stirring of the reaction mixture; it is proportionally higher, all other parameters remaining unchanged, the greater the intensity of stirring. The latices prepared by seeded emulsion polymerization in the presence of a latex prepared according to this technique, as a seeding material, contain nonspherical particles, and this renders them unsuitable for many applications.

SUMMARY OF THE INVENTION

Accordingly, a major object of the present invention is the provision of an improved technique for the production of latices of vinyl chloride polymers, such latices being comprised of monodisperse particles, and which improved technique is conspicuously devoid of those disadvantages and drawbacks to date characterizing the state of this art.

Another object of this invention is the provision of improved technique for the production of such latices in but a single polymerization stage, or at most two polymerization stages, and whereby vinyl chloride polymers are obtained in the form of latices comprised of monodisperse particles, and more particularly latices comprised of coarse particles thereof. Indeed, the molecular weight of the vinyl chloride polymers prepared according to the invention does not depend on the intensity of stirring of the reaction mixture. The latices prepared according to the invention, whether derived from the first or the second stage, are free from nonspherical particles. Furthermore, the process of the invention produces a quantity of buildup which is substantially less than that formed when employing the vinyl chloride homo- and copolymerization technique described by Laaksonen and Stenius, supra.

Briefly, the present invention features the preparation of homo- and copolymers of vinyl chloride in the form of a latex containing monodisperse particles, by polymerization of the corresponding monomer(s) in aqueous emulsion, in one or two stages, the first stage being carried out in the absence of surface-active agent and in the presence of at least 0.2%, and preferably from 0.3 to 1%, by weight relative to the monomer(s), of at least one water-soluble initiator selected from among the alkali metal persulfates and ammonium persulfate.

DETAILED DESCRIPTION OF THE PREFERRED EMBODIMENTS OF THE INVENTION

More particularly according to the present invention, the first polymerization stage is carried out in the presence of at least one water-soluble auxiliary compound, which is a solvent for vinyl chloride, in such amount that the solubility of vinyl chloride in the aqueous phase at 25° C. and atmospheric pressure is at least 1.5 g/l.

Consistent herewith, by "vinyl chloride polymers" are intended homo- and copolymers, the latter containing at least 50% by weight of vinyl chloride and at least one comonomer copolymerizable with vinyl chloride. The copolymerizable monomers are those generally employed in the conventional techniques for copolymerization of vinyl chloride. Representative are vinyl esters of mono- and polycarboxylic acids such as vinyl acetate, propionate and benzoate, unsaturated mono- and polycarboxylic acids such as acrylic, methacrylic, maleic, fumaric and itaconic, and their aliphatic, alicyclic and aromatic esters, their amides and their nitrites, allyl, vinyl and vinylidene halides, alkyl vinyl ethers, and olefins.

Also consistent herewith, by "first" stage is intended, for the sake of simplicity, both the total stage of a single-stage process, as well as the first stage of a two-stage process.

Indeed, it has now unexpectedly been found that it is possible, without resorting to salts other than a water-soluble initiator, to obtain by polymerization in aqueous emulsion, in a single stage, vinyl chloride polymers in the form of latices containing monodisperse particles having a mean diameter of from 0.17 $\mu$m to 0.8 $\mu$m and a molecular weight which is independent of the intensity of stirring of the reaction mixture, if a water-soluble auxiliary compound which is a solvent for vinyl chloride is employed, in such amount that at 25° C. and at atmospheric pressure, the solubility of vinyl chloride in the aqueous phase is at least 1.5 g/l.

The auxiliary compound is advantageously selected from among the alcohols and ketones containing from 1 to 16 carbon atoms, such as, especially, methyl alcohol, ethyl alcohol, butyl alcohol, dimethyl ketone and methyl ethyl ketone.

The auxiliary compound may also be selected from among the monoolefinically unsaturated compounds which are, if desired, copolymerizable with vinyl chloride, such as vinyl acetate, vinyl proprionate and alkyl acrylates in which the alkyl moiety contains from 1 to 8 carbon atoms, such as, especially, methyl acrylate, ethyl acrylate or butyl acrylate.

The choice of the auxiliary compound to be employed is a function of the molecular weight of the polymer sought to be prepared. The proportion of the auxiliary compound that is used, by weight relative to the monomer(s) employed to carry out the first stage, is a function of its nature and of the content by weight of the water in the reaction mixture. It is proportionally higher, all other parameters remaining unchanged, the higher the weight content of the water. This proportion generally ranges from 1 to 100%. The choice and the proportion of the auxiliary compound are readily determined by tests well known to this art.

An excessively high proportion of auxiliary compound produces a latex which ultimately coagulates or results in the formation of buildup.

An excessively low proportion of auxiliary compound results in the disadvantages referred to above in connection with the technique described by Laaksonen and Stenius.

At the beginning of the first stage of the process of the invention, the monomer(s) content of the reaction mixture generally ranges from 1 to 50% and preferably from 1 to 30% by weight.

To carry out the first stage of the invention, the reaction mixture is adjusted to and usually maintained at an autogenous pressure under moderate stirring at a polymerization temperature which generally ranges from 20° to 80° C. The polymerization temperature may be varied during the reaction. The intensity of stirring is adjusted as a function of the mean particle diameter sought to be produced. It is proportionally higher, all other parameters remaining unchanged, the higher the mean particle diameter.

In the case where the process of the invention is carried out in a single stage, the reaction is terminated after pressure drop and the unconverted monomer(s) and the auxiliary compound are degassed by applying a vacuum to the reactor.

In the case where the process of the invention is carried out in two stages, the second stage is conducted in the presence of at least a part of the latex emanating from the first stage as a seed material. It may be carried out utilizing any technique of seeded emulsion polymerization per se known to this art.

Thus, it has also unexpectedly been found that carrying out a seeded emulsion polymerization in a second stage, in the presence of at least a part of the latex emanating from the first stage of the process according to the invention as a seed material, via any technique of seeded emulsion polymerization per se known to the art, it is possible to produce vinyl chloride polymers in the form of latices containing monodisperse particles having a mean diameter of from 0.5 to 1.2 μm, such latices being devoid of nonspherical particles.

Between the two stages of polymerization, the latex emanating from the first stage of the process of the invention may, if desired, be subjected to a partial or complete degassing of the unconverted monomer(s) and of the auxiliary compound.

The second stage of the process of the invention is generally carried out in the presence of a water-soluble initiator combined, if desired, with a reducing agent, and of an anionic emulsifier combined, if desired, with a nonionic emulsifier.

Exemplary of the water-soluble initiators to be employed in the second stage of the process of the invention, representative are hydrogen peroxide, alkali metal persulfates, ammonium persulfate, alkali metal perborates, ammonium perborate, tert-butyl hydroperoxide and azobisisobutyronitrile. These are employed in a quantity which generally ranges from 0.01 to 2%, by weight relative to the monomer (s) employed during the second stage. If desired, these initiators are in combination with a water-soluble reducing agent such as, for example, sodium formaldehyde sulfoxylate, sodium sulfite, and sodium thiosulfate. The reducing agents are employed in a quantity generally ranging from 0.01 to 0.5%, by weight relative to the monomer(s) employed during the second stage.

The anionic emulsifiers are preferably fatty acid soaps, alkali metal alkyl sulfates, alkali metal alkylsulfonates, alkali metal alkylsulfosuccinates, alkali metal alkyl phosphates and the nonionic emulsifiers produced by polycondensates of ethylene and/or propylene oxide with various hydroxylated organic compounds such as fatty alcohols and nonylphenols. The emulsifiers are employed in proportions which generally range from 0.05 to 3%, and preferably from 0.1 to 1%, by weight relative to the monomer(s) employed during the second stage. Said emulsifiers may be employed either in total before the polymerization or partly before the polymerization, partly during the polymerization, continuously or intermittently, and, if desired, partly after the polymerization.

The amount of seed material used in the second stage of the process of the invention is such that the quantity of polymer which it contains generally constitutes from 0.3 to 30%, by weight of the total polymer plus monomer(s) employed.

An amount of seed polymer constituting more than 30% may be employed, but offers little advantage, because it is then very high in relation to the monomer(s) and the advantages conferred by the second stage of the process of the invention are reduced to a minimum.

An amount of seed polymer constituting less than 0.3% is to be avoided, because it presents the risk of effecting the nucleation of new particles.

The amount of water in the second stage of the process of the invention is such that the initial content of seed polymer plus monomer(s), account being taken of the water content of the seed material, generally ranges from 1 to 45%, and preferably from 10 to 30%, by weight relative to the reaction mixture.

The mean diameter of the latex particles sought to be produced upon completion of the second stage of the process of the invention is controlled according to the usual methods which apply to seeded emulsion polymerization, such as a judicious selection of the nature of the emulsifier and of the mean particle diameter of the seed material prepared during the first stage, and of the proportion, by weight relative to the monomer(s) to be polymerized, of the said emulsifier and of the polymer in the seed material.

In order to carry out the second stage of the process of the invention, the reaction mixture is usually maintained, or adjusted to and maintained at autogenous pressure under moderate stirring at a polymerization temperature which generally ranges from 20° to 80° C. After the pressure drop, the reaction is terminated and the unconverted monomer(s) and the auxiliary compound are degassed by applying a vacuum to the reactor.

The vinyl chloride polymers prepared by means of the present invention can, if desired, be separated from the polymerization medium by any known methods such as filtration, ultrafiltration, coagulating-dewatering, flaking, centrifugal gravity separation and spraying.

The polymers of the invention, in addition to being adapted for use, in latex form, in the applications described above, can also be used in the manufacture of sheets, films, hollow articles, cellular materials, articles molded by calendering, extrusion, blow extrusion and injection techniques, and in the manufacture of spread coatings and articles molded by all techniques for converting plastisols and organosols, such as coating, rotational molding, dip coating and spraying.

In order to further illustrate the present invention and the advantages thereof, the following specific examples are given, it being understood that same are intended only as illustrative and in nowise limitative.

Examples 1 to 6, 15 and 16 are given by way of comparison.

Examples 7 to 14 and 17 are according to the invention.

According to Examples 1 to 14, the process comprises one polymerization stage.

According to Examples 15, 16 and 17, the process comprises two polymerization stages, the second stage being carried out in the presence, as seed material, of a portion of the latex prepared according to Examples 1, 4 and 12, respectively, after degassing of the latex.

The polymerization was carried out in a 2-liter capacity vertical stainless steel reactor, equipped with a jacket for circulating heat transfer fluid and provided with an anchor stirrer.

The solubility of vinyl chloride at 25° C., at atmospheric pressure, in the aqueous phase to be examined, was determined by gas phase chromatography according to the method known as "external standardization method" described in the text entitled "Manuel Pratique de Chromatographie en Phase Gazeuse" [Practical Manual of Gas-Phase Chromatography], Jean Tranchant, 3rd edition, 1982, Masson publishers. This method is as follows:

The standard solutions are solutions of vinyl chloride in 1,2-dichloroethane.

The solution to be analyzed is prepared as follows:

50 g of the aqueous phase to be analyzed are introduced into an aerosol can, 150 ml in capacity, followed, after the can has been crimped, by 50 g of vinyl chloride. The can is agitated for 24 hours at 25° C. and then approximately 20 ml of the resulting solution are transferred into a 50-ml capacity conical flask which is closed immediately afterwards by means of a septum. A few minutes before the chromatographic determination, the septum is pierced with a needle.

The chromatographic determination is carried out using the instrument marketed as SIGMA BB, fitted with a flame ionization detector, marketed by Perkin-Elmer. The operating conditions of the measurement are as follows:

(i) column: stainless steel tube 3.175 mm (⅛ inch) in diameter and 2.5 m in length;

(ii) stationary phase: product marketed under the trademark CARBOWAX 20 M 10% ON CHROMOSORB WHP 90–100 MESH, manufactured by Johns Manville and marketed by Alltech Europe;

(iii) quantity of injected solution: 2 μl;

(iv) injector temperature: 160° C.;

(v) detector temperature: 160° C.;

(vi) oven temperature: 60° C. for 4 minutes, followed by a temperature increase from 60° to 150° C. at a rate of 10° C./min;

(vii) carrier gas (nitrogen) flow-rate: 30 ml/min (gas volume corrected to normal temperature and pressure conditions: 0° C. and 101,325 Pa);

(viii) air pressure: 206,840 Pa (30 psig);

(ix) hydrogen pressure: 124,104 Pa (18 psig).

The solids content of the latices, on a weight basis, is determined by weighing a sample of a few grams of the latices, before and after drying at 80° C. for 2 hours.

The mean particle diameter of the latices and the polydispersity coefficient of their particle size distribution are determined by analysis of the light scattered by the latices at an angle of 90° C. The light, which is strictly monochromatic, is produced by a laser. The intensity of the scattered light is recorded by a photomultiplier as a function of time and is analyzed by a microcomputer. The polydispersity coefficient determined in this manner is equal to the factor which is known in the art as the Pusey factor. In the case of a narrow particle size distribution, the value of the Pusey factor lies proportionally closer to the square of the standard deviation of said distribution, taken as a measurement, the narrower the distribution. The measurements are done using any suitable instrument of the photon correlator type and especially of the instrument known as a Malvern Autosizer.

The molecular weight of the vinyl chloride polymers is evaluated by means of their viscosity number, determined according to international standard ISO 174 after recovery of the polymers in the dry powder state by drying a portion of the latices using spray drying.

The proportion of buildup formed in the reactor during the polymerization is determined after the reactor has been drained and cleaned, and is equal to the ratio, expressed as a percentage, of the weight of buildup collected, determined after drying, to the weight of the polymer in the latex obtained.

EXAMPLES 1 TO 17

The first stage and, where applicable, the second stage of polymerization were carried out according to the following operating procedure:

After the introduction of water into the reactor, containing, where applicable, the seed material, and the closure and application of vacuum to the reactor, the reactor was purged with vinyl chloride and a vacuum was again applied. The other ingredients, except for the monomer and the polymerization initiator, were introduced and the stirrer was activated. The monomer to be polymerized was introduced and the reactor jacket was heated to the selected polymerization temperature. Once this temperature had been attained, the polymerization initiator was introduced under nitrogen pressure and the temperature was maintained until the pressure in the reactor decreased by 2 bars.

After degassing of the unconverted monomer(s) and; where applicable, the auxiliary compound, a latex was produced.

Table 1 reports the nature and the quantity of the ingredients employed for each of Examples 1 to 14.

Table 2 reports the solubility of vinyl chloride in the aqueous phase at 25° C. at atmospheric pressure, for each of Examples 1 to 14.

Table 3 reports the nature and the quantity of the ingredients employed in carrying out the second stage of polymerization, for each of Examples 15 to 17.

Tables 2 and 3 also report, for each of Examples 1 to 14 and for the second stage of each of Examples 15 to 17, respectively:

(a) the polymerization temperature;

(b) the speed of rotation of the stirrer;

(c) the polymerization time;

(d) the solids content by weight of the latex produced;

(e) the mean diameter of the particles of the latex produced;

(f) the polydispersity coefficient of the particle size distribution of the particles of the latex produced;

(g) the viscosity number of the polymer prepared; and (h) the proportion of buildup.

It was found that the latex prepared in two stages in Example 17 according to the invention was free from nonspherical particles, whereas the latex also prepared in two stages in Comparative Example 16 comprised nonspherical particles.

TABLE 1

| | COMPARATIVE EXAMPLES | | | | | | EXAMPLES ACCORDING TO THE INVENTION | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Water | 930 | 930 | 930 | 1350 | 1350 | 1350 | 1350 | 800 | 1350 | 1350 | 1350 | 1350 | 1350 | 1350 |
| Vinyl chloride (g) | 400 | 400 | 400 | 150 | 150 | 150 | 158 | 142 | 158 | 158 | 158 | 158 | 158 | 158 |
| Methyl alcohol (g) | — | — | — | — | — | — | 67.5 | 480 | — | — | — | — | — | — |
| Dimethyl ketone (g) | — | — | — | — | — | — | — | — | 67.5 | — | — | — | — | — |
| Methyl ethyl ketone (g) | — | — | — | — | — | — | — | — | — | 67.5 | 67.5 | — | — | — |
| Vinyl acetate (g) | — | — | — | — | — | — | — | — | — | — | — | 67.5 | 67.5 | — |
| Butyl acrylate (g) | — | — | — | — | — | — | — | — | — | — | — | — | — | 135 |
| Potassium persulfate (g) | 0.2 | 0.2 | 0.2 | 3.6 | 3.6 | 3.6 | 0.5 | 0.5 | 0.5 | 0.5 | 0.5 | 0.5 | 0.5 | 0.5 |
| Sodium hydroxide (g) | 0.24 | 0.24 | 0.24 | — | — | — | — | — | — | — | — | — | — | — |

TABLE 1-continued

| | COMPARATIVE EXAMPLES | | | | | | EXAMPLES ACCORDING TO THE INVENTION | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Sodium laurate (g) | 2.8 | — | 2.8 | — | — | — | — | — | — | — | — | — | — | — |
| Sodium versatage (g) | — | 10 | — | — | — | — | — | — | — | — | — | — | — | — |
| Potassium chloride (g) | — | — | — | 4.45 | 4.45 | 4.45 | — | — | — | — | — | — | — | — |

TABLE 2

| | COMPARATIVE EXAMPLES | | | | | | EXAMPLES ACCORDING TO THE INVENTION | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Solubility of vinyl chloride (g) | 1.1 | 1.3 | 1.1 | 1.0 | 1.0 | 1.0 | 2.0 | 16 | 2.7 | 2.4 | 2.4 | 2.5 | 2.5 | 3.0 |
| Polymerization temperature (° C.) | 55 | 55 | 55 | 58 | 58 | 65 | 58 | 58 | 58 | 58 | 65 | 58 | 58 | 58 |
| Speed of rotation of the stirrer (rev/min) | 150 | 150 | 250 | 110 | 350 | 110 | 110 | 110 | 110 | 110 | 110 | 210 | 90 | 110 |
| Polymerization time (h) | 7 | 6 | 6.5 | 2 | 0.3 | 1.3 | 5.5 | 8 | 6 | 6 | 4 | 3 | 3 | 4 |
| Latex solids content by weight (%) | 27 | 29 | 28 | 9 | 5 | 8 | 6 | 3 | 7 | 7 | 8 | 14 | 13 | 12 |
| Mean diameter of the latex particles (μm) | 0.12 | 0.15 | 0.12 | 0.32 | 0.51 | 0.47 | 0.36 | 0.61 | 0.31 | 0.32 | 0.35 | 0.25 | 0.20 | 0.22 |
| Polydispersity coefficient | 0.15 | 0.11 | 0.15 | 0.01 | 0.07 | 0.02 | 0.02 | 0.06 | 0.01 | 0.02 | 0.04 | 0.01 | 0.01 | 0.01 |
| Viscosity number (ml/g) | 125 | 126 | 124 | 46 | 86 | 40 | 72 | 61 | 70 | 62 | 45 | 82 | 81 | 79 |
| Proportion of buildup (%) | 1 | 0.8 | 3.5 | 7 | 60 | 6 | 3.5 | 4.3 | 3 | 0.8 | 0.8 | 2 | 0.8 | 0.8 |

TABLE 3

| | COMPARATIVE EXAMPLES | | EXAMPLES ACCORDING TO THE INVENTION |
|---|---|---|---|
| | 15 | 16 | 17 |
| Water (g) | 800 | 800 | 930 |
| Seeding material: | | | |
| Latex of Example 1 (g) | 120 | | |
| Latex of Example 4 (g) | — | 100 | |
| Latex of Example 12 (g) | — | — | 71 |
| Vinyl chloride (g) | 1000 | 200 | 200 |
| Potassium persulfate (g) | 0.7 | 0.4 | 1.4 |
| Sodium versatate (g) | 25 | 2 | 5 |
| Polymerization temperature (° C.) | 55 | 55 | 58 |
| Speed of the rotation stirrer (rev/min) | 110 | 110 | 110 |
| Polymerization time (h) | 3 | 2.5 | 4.5 |
| Latex solids content by weight (%) | 51 | 15 | 14 |
| Mean diameter of the latex particles (μm) | 0.37 | 0.90 | 0.88 |
| Polydispersity coefficient | 0.12 | 0.09 | 0.06 |
| Viscosity number (ml/g) | 125 | 95 | 115 |
| Proportion of buildup (%) | 4 | 5 | 2 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aqueous latex comprised of monodisperse spheroidal particles of vinyl chloride polymer having a polydispersity coefficient not exceeding 0.06, said spheroidal particles having a mean diameter ranging from 0.17 to 0.8 μm, and said latex being devoid of nonspherical polymer particulates.

2. An aqueous latex comprised of coarse monodisperse spheroidal particles of vinyl chloride polymer having a polydispersity coefficient not exceeding 0.06, said spheroidal particles having a mean diameter ranging from 0.5 to 1.2 μm, and said latex being devoid of nonspherical polymer particulates.

3. A plurality of monodisperse spheroidal particles of a vinyl chloride polymer having a polydispersity coefficient not exceeding 0.06, said spheroidal particles having a mean diameter ranging from 0.17 to 0.8 μm, and devoid of nonspherical polymer particulates.

4. A plurality of monodisperse spheroidal particles of a vinyl chloride polymer having a polydispersity coefficient not exceeding 0.06, said spheroidal particles having a mean diameter ranging from 0.5 to 1.2 μm, and devoid of nonspherical polymer particulates.

5. A monodisperse particle latex of a vinyl chloride polymer having a polydispersity coefficient not exceeding 0.06, made by a process comprising aqueous emulsion polymerizing, in one or more stages, vinyl chloride monomer in the absence of surface-active agent in the first stage, in the presence of at least 0.2% by weight of at least one water-soluble alkali metal or ammonium persulfate initiator, and also in the presence of at least one water-soluble auxiliary compound that is a solvent for vinyl chloride said solvent not being capable of copolymerizing with said vinyl chloride monomer, in such amount that the solubility of vinyl chloride in the aqueous phase at 25° C. at atmospheric pressure is at least 1.5 g/l.

6. The monodisperse particle latex of claim 5, wherein said aqueous emulsion polymerization takes place in two stages and the second stage of aqueous emulsion polymerization is carried out in the presence of a seed amount of at least a part of the latex emanating from the first stage.

* * * * *